(12) United States Patent
Yan et al.

(10) Patent No.: US 9,607,394 B2
(45) Date of Patent: Mar. 28, 2017

(54) INFORMATION PROCESSING METHOD AND ELECTRONIC DEVICE

(71) Applicant: Lenovo (Beijing) Co., Ltd., Beijing (CN)

(72) Inventors: Qiong Yan, Beijing (CN); Lin Sun, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/658,756

(22) Filed: Mar. 16, 2015

(65) Prior Publication Data

US 2016/0148343 A1    May 26, 2016

(30) Foreign Application Priority Data

Nov. 20, 2014  (CN) .......................... 2014 1 0670018
Dec. 25, 2014  (CN) .......................... 2014 1 0829516

(51) Int. Cl.
| | | |
|---|---|---|
| G09G 5/00 | (2006.01) | |
| G06T 7/00 | (2017.01) | |
| G06T 11/60 | (2006.01) | |

(52) U.S. Cl.
CPC ............ *G06T 7/0081* (2013.01); *G06T 11/60* (2013.01); *G06T 2207/20144* (2013.01)

(58) Field of Classification Search
None
See application file for complete search history.

(56) References Cited

U.S. PATENT DOCUMENTS

| | | | | |
|---|---|---|---|---|
| 5,577,179 A | * | 11/1996 | Blank | H04N 1/3873 345/639 |
| 5,818,962 A | * | 10/1998 | Mizukami | G06T 3/00 382/180 |
| 9,197,874 B1 | * | 11/2015 | Pan | H04N 13/0022 |
| 2005/0024387 A1 | * | 2/2005 | Ratnakar | G06T 11/60 345/629 |
| 2008/0219587 A1 | * | 9/2008 | Avidan | G06T 3/0012 382/276 |
| 2008/0228928 A1 | * | 9/2008 | Donelli | G06F 17/30029 709/228 |
| 2011/0069071 A1 | * | 3/2011 | Karlsson | G06T 19/00 345/427 |
| 2014/0025529 A1 | * | 1/2014 | Honeycutt | G06Q 30/0621 705/26.5 |
| 2015/0097827 A1 | * | 4/2015 | Cohen | G06T 5/005 345/420 |

* cited by examiner

*Primary Examiner* — David H Chu
(74) *Attorney, Agent, or Firm* — Brinks Gilson & Lione; G. Peter Nichols

(57) ABSTRACT

An information processing method is described that includes obtaining a first operation that is used to select a foreground image from a first picture; determining the foreground image in the first picture based on the first operation; obtaining status information of the foreground image; obtaining a second operation that is used to place the foreground image into a second picture; determining the second picture which serves as a background based on the second operation; obtaining status information of the second picture; determining a target size occupied by the foreground image in the second picture based on the status information of the foreground image and the second picture; scaling the foreground image into the target size; and displaying the foreground image in the second picture with the target size. An electronic device is also described.

8 Claims, 10 Drawing Sheets

INFORMATION PROCESSING METHOD AND ELECTRONIC DEVICE

This application claims priority to Chinese patent application No. 201410670018.2 filed on Nov. 20, 2014; and also to Chinese patent application No. 201410829516.7 filed on Dec. 25, 2014, the entire contents of which are incorporated herein by reference.

BACKGROUND

The present application relates to the field of electronic technique, and more particularly, to an information processing method and an electronic device.

Background replacement is a common function in image editing application software, it is such a process: an object O in a picture A is placed in another picture B as foreground, wherein the object O is called a foreground object or a foreground image. During such process of background replacement, usually, the foreground object O needs to be scaled. Typically, there are two reasons to scale the foreground object: the first reason is that scaling makes a dimension size of the foreground object O and that of the picture B match in human vision; and the second reason is that after moving the foreground object O into the picture B, it needs to scale the foreground object O so as to fit the new background (i.e., the picture B). The aforesaid manual scaling process causes a relatively high difficulty to learn the background replacement function; it is not easy for a non-professional editor to master this function.

SUMMARY

In view of the above, embodiments of the present application provide an information processing method and an electronic device to solve the at least one problem existing in the prior art, so that it is possible to scale the foreground image automatically, and thereby improve user experience.

The technical solutions of the embodiments of the present application are implemented by the following:

The embodiments of the present application provide an information processing method and an electronic device, comprising: obtaining a first operation, the first operation being used to select a foreground image from a first picture; determining the foreground image in the first picture based on the first operation; obtaining status information of the foreground image; obtaining a second operation, the second operation being used to place the foreground image into a second picture; determining the second picture which serves as a background based on the second operation; obtaining status information of the second picture; determining a target size occupied by the foreground image in the second picture based on the status information of the foreground image and the status information of the second picture; scaling the foreground image into the target size; and displaying the foreground image in the second picture with the target size. In this way, it is possible to scale the foreground image automatically, and thereby improve user experience.

DETAILED DESCRIPTION

An embodiment of the present application provides an information processing method, which pertains to the field of image processing and is applied to an electronic device. The electronic device comprises a smart phone, a tablet PC, a notebook computer, a desktop computer, a navigation system, a personal digital assistant (PDA), an electronic reader, and other terminals, and it can run application program (hereinafter referred to as application for short) that at least comprises an application for editing picture. Specifically, the electronic device according to an embodiment of the present application may further comprise an image acquiring unit, like a camera, which may be further used to obtain depth information of a shot object, in addition to the imaging function of an ordinary camera. In a specific implementation, the camera may be an array camera, which is composed by a plurality of optical systems and a plurality of image sensors, the array camera may acquire two or more pictures concurrently, then synthesize data through algorithms and form an image, and may also estimate depth information by adopting algorithms. The plurality of sensors in the array camera also help to create a variety of special effects, for example, it may choose any object to focus, choose any object to re-focus while or after taking a picture in a scene; the array camera may also focus on multiple objects.

The information processing method provided by an embodiment of the present application may be implemented by means of invoking program codes by a processor in the electronic device, or implemented by an application, like a picture editing application, which may be pre-set by a manufacturer of the electronic device in the electronic device so that the user can use it or may be, of course, downloaded by the user from an application store, no matter in what manner, the information processing method may be stored in a computer storage medium in form of program codes. It should be noted that the electronic device may also comprise the array camera as described above and the like besides the processor and the storage medium.

Hereinafter, the technical solutions of the present application will be further described in detail in conjunction with the drawings and the specific embodiments.

Figure 1A:
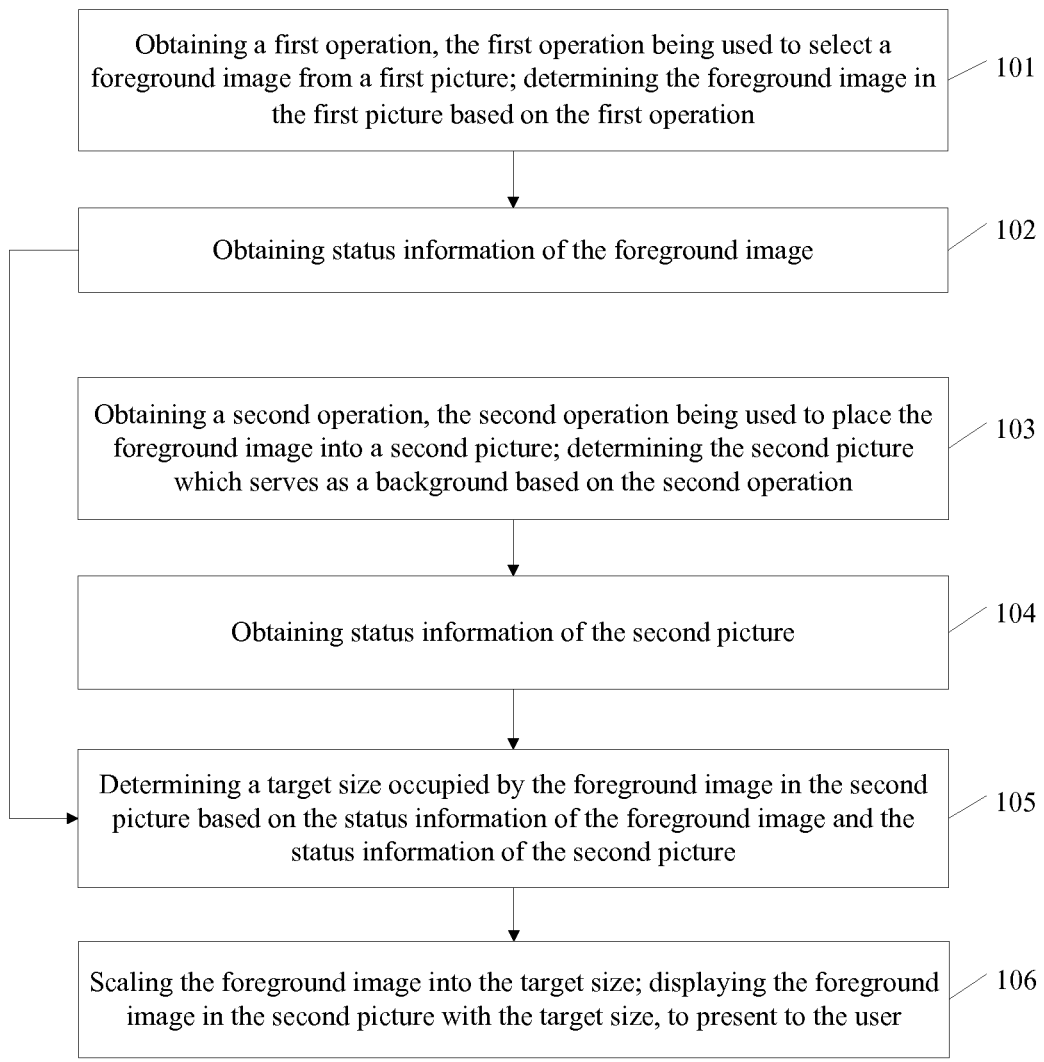
FIG. 1A is a schematic flowchart of implementation of an information processing method according to a first embodiment of present application.

FIG. 1A is a schematic flowchart of implementation of an information processing method according to a first embodiment of present application, as shown in FIG. 1A, the method comprises:

step 101: obtaining a first operation, the first operation being used to select a foreground image from a first picture; determining the foreground image in the first picture based on the first operation.

Herein, the first operation may be a predetermined action, in a specific implementation, the first operation may be a predetermined action in a picture editing application, for example, the picture editing application is enabled, a first picture is opened by using the picture editing application, thereafter a built-in tool in the picture editing application like a selecting tool or a cutting tool and so on is adopted to select an object from the first picture, this object is regarded as a foreground image. Of course, there is also a more convenient operating manner, for example, if a display unit of the electronic device is a touch type display screen, then the user can long-press a certain object in the first picture and regard the object as a foreground object, wherein long-press means an operating body stays on the object for a time period equal to or more than a threshold, for example, staying two seconds or more is regarded as a long-press operation, the operating body may be a finger and may be also be a stylus, it is allowed to long-press with a single finger or two fingers when adopting finger to long-press.

Herein, the first picture is composed by pixel points, each pixel point may comprise the following information, like color information and depth information, wherein the color information may be denoted by gray scale information and may also be denoted by chromatic information, the color is denoted only by brightness when adopting the gray scale information to denote, and denoted by saturation, tone, and brightness when adopting the chromatic information to denote.

Step 102, obtaining status information of the foreground image.

Herein, the status information at least comprises depth information of an object in a picture and a size occupied by the object in the picture, the size refers to a size of area that is occupied by the object, usually, the size occupied by the object may be denoted by the number of pixel points. The status information of the foreground image comprises depth information of the foreground image and a size occupied by the foreground image. Those skilled in the art can obtain the status information of the foreground image through various techniques, no more details repeated here.

Step 103, obtaining a second operation, the second operation being used to place the foreground image into a second picture; determining the second picture which serves as a background based on the second operation.

Herein, the first picture and the second picture are different, which only refers to that the background of the first picture and that of the second picture are different.

Step 104, obtaining status information of the second picture.

Herein, the status information of the second picture comprises depth information of respective objects in the second picture, when the second picture comprises a plurality of objects, depth information of respective objects in the second picture may be the same and may also be different, wherein an object in the second picture may be a certain portion of a human face or human body, of course it may also be a scenery like a big tree, or a still object like a desk or a wall and so on.

Step 105, determining a target size occupied by the foreground image in the second picture based on the status information of the foreground image and the status information of the second picture.

Step 106, scaling the foreground image into the target size; displaying the foreground image in the second picture with the target size, to present to the user.

In the embodiment of the present application, when the display unit of the electronic device is a touch type display screen, obtaining a first operation may comprise step A1 and step A2, in which:

step A1, detecting whether there is occurrence of a touch operation that satisfies a first predetermined condition;

step A2, determining as obtaining the first operation when the touch operation satisfies the first predetermined condition.

Herein, the touch operation satisfies the first predetermined condition may be implemented, but not limited to, by the following manner: whether the touch operation is a single-click touch operation; or whether the touch operation is a double-click touch operation.

Herein, when the display unit of the electronic device is a non-touch type display screen, that is, the electronic device adopts the key input manner, obtaining a first operation comprises steps B1 and B2, in which:

step B1, detecting whether there is occurrence of a key pressing operation that satisfies a second predetermined condition;

step B2, determining as obtaining the first operation when the key pressing operation satisfies the second predetermined condition.

Herein, the key pressing operation satisfies the second predetermined condition may be implemented, but not limited to, by the following manner: whether the key pressing operation is long-pressing a certain key, such as pressing the functional key HOME for more than two seconds; or whether the key pressing operation is a combination of certain keys, such as the combination of the functional key Home and a volume key.

In the embodiment of the present application, the first operation and the second operation are actions having coherence, or the first operation and the second operation are two actions having a spacing of a first time period. When the first operation and the second operation are two actions having a spacing of a first time period, the above operation of obtaining the first operation can be similarly applied to the operation of obtaining the second operation, no more details repeated.

Figure 1B:
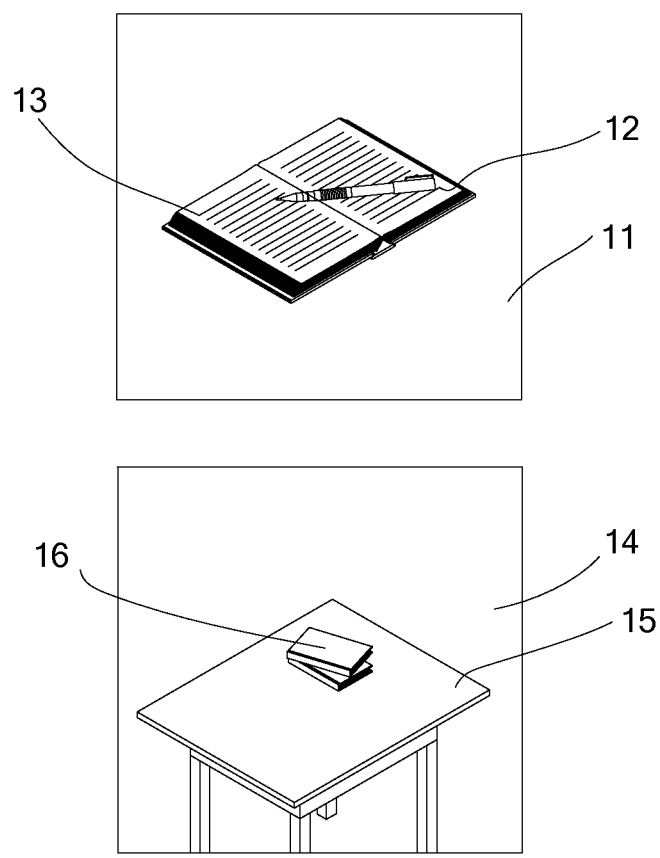
FIGS. 1B to 1E are operation schematic diagrams when a first operation and a second operation are actions having coherence in the first embodiment of the present application.
Figure 1C:
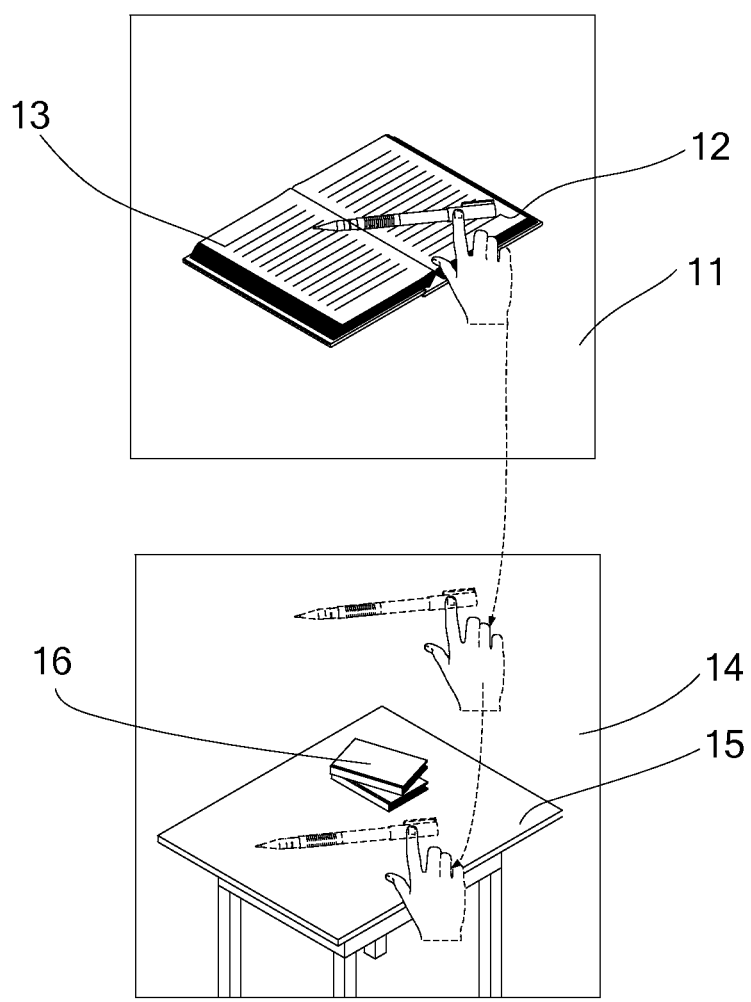
Figure 1D:
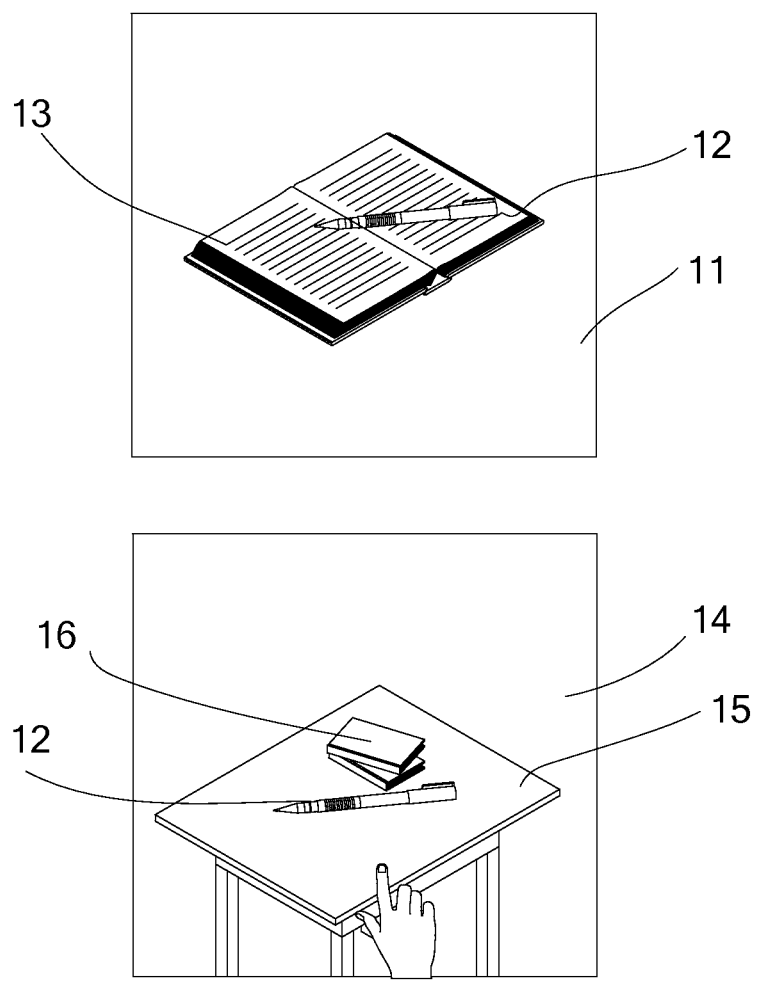
Figure 1E:
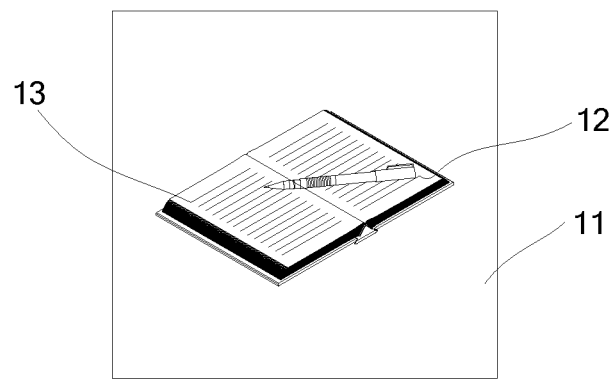
Figure 1E:
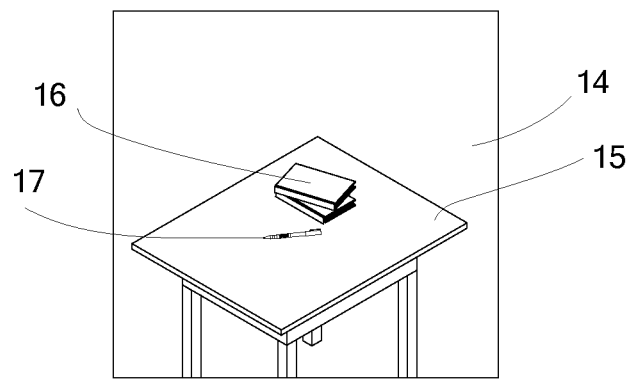

Next, scenes where the technical solution provided by the embodiment of the present application may be applied will be described with the first operation and the second operation are actions having coherence as an example. A picture editing application is enabled, as shown in FIG. 1B, two pictures 11 and 14 are opened by using the picture editing application, wherein the first picture 11 comprises a book 13 on which a pen 12 is lying; the second picture 14 comprises a desk 15 on which a stack of books 16 is lying. Thereafter, as shown in FIG. 1C, the user long-presses the pen 12 in the first picture 11, then the pen 12 is selected as the foreground image, then the pen 12 is placed on the desk 15 in the second picture 14 by dragging. As shown in FIG. 1D, the user releases the pen 12 at a proper position; as shown in FIG. 1E, a size of the pen 12 is scaled into a size of the pen 17, as can be perceived by the user, the application zooms out the size of the pen 12 in the first picture, so as to obtain the size of the pen 17, and thereby better fit the background in the second picture. It should be noted that during the process that the user long-presses the pen 12, the application can obtain the status information of the pen 12, when the user releases the pen 12, the application can also obtain the status information of the second picture 14, in this way, the application can determine the target size occupied by the pen 12 in the second picture 14 based on the status information of the pen 12 and the status information of the second picture 14; then the pen 12 is scaled as the target size (i.e., the size of the pen 17); finally, the pen 12 is displayed in the second picture 14 with the size of the pen 17, so as to present to the user. In this embodiment, the user implements the first operation and the second operation by a series of actions of long-pressing to select the foreground image and dragging the foreground image to a target position.

Figure 1F:
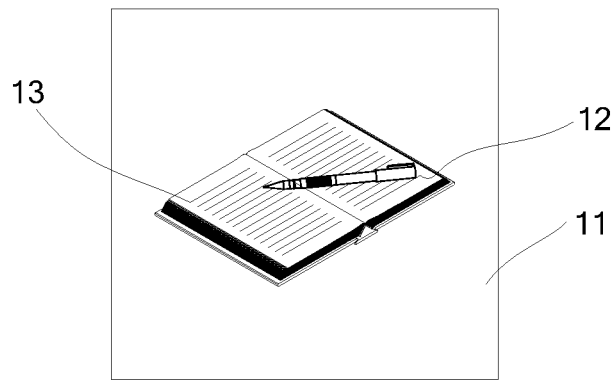
FIGS. 1F to 1J are operation schematic diagrams when the first operation and the second operation are two actions in the first embodiment of the present application.
Figure 1G:
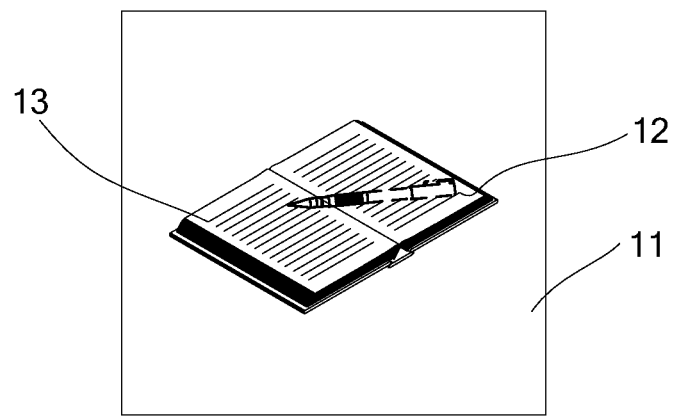
Figure 1H:
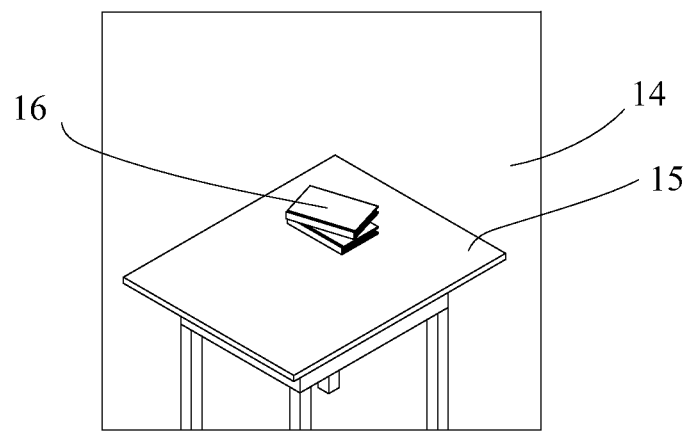
Figure 1I:
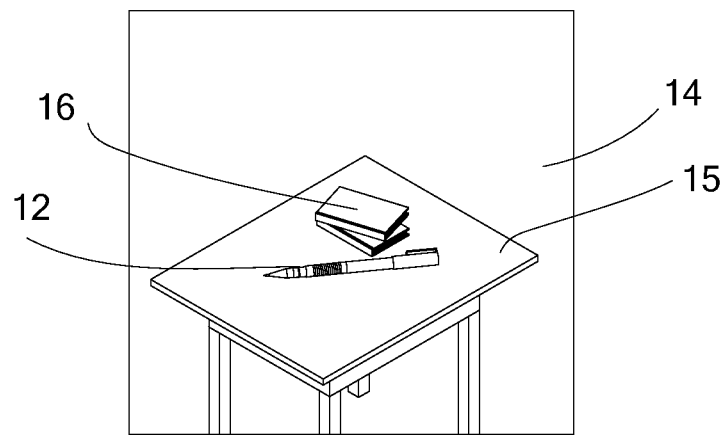
Figure 1J:
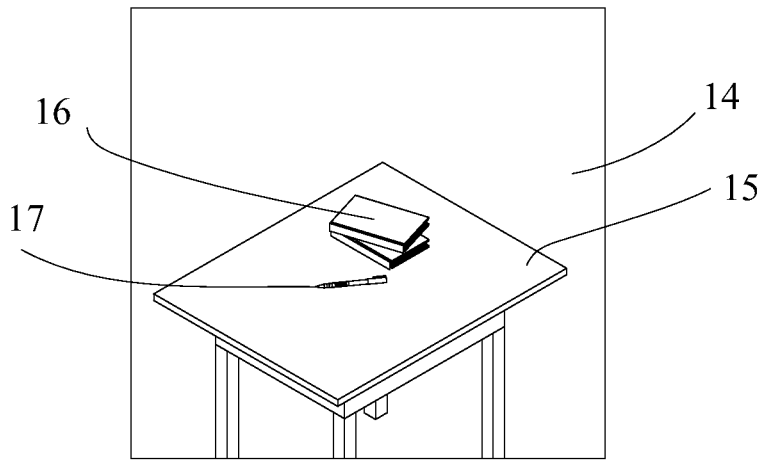

Next, scenes where the technical solution provided by the embodiment of the present application may be applied will be described with the first operation and the second operation are two actions having a spacing of a first time period as an example. A picture editing application is enabled, as shown in FIG. 1F, a first picture 11 is opened by using the picture editing application, wherein the first picture 11 comprises a book 13 on which a pen 12 is lying; thereafter, as shown in FIG. 1G, the user selects the pen 12 in the first picture 11 through a selecting tool on the application (the pen 12 in FIG. 1G is denoted by dotted line, which shows that the pen 12 is selected by the user), that is, the pen 12 is selected as the foreground image. Then, as shown in FIG. 1H, a second picture 14 is opened by using the picture editing application, the second picture 14 comprises a desk 15 on which a stack of books 16 is lying; thereafter, as shown in FIG. 1I, the user selects a proper position by the mouse or hand to place the previously selected pen 12 on the desk 15 in the second picture 14. As shown in FIG. 1J, a size of the pen 12 is scaled into a size of the pen 17, as can be perceived by the user, the application zooms out the size of the pen 12 in the first picture, so as to obtain the size of the pen 17, and thereby better fit the background in the second picture. It should be noted that during the process that the user long-presses the pen 12, the application can obtain the status information of the pen 12, when the user releases the pen 12, the application can also obtain the status information of the second picture 14, in this way, the application can determine the target size occupied by the pen 12 in the second picture 14 based on the status information of the pen 12 and the status information of the second picture 14; then the pen 12 is scaled as the target size (i.e., the size of the pen 17); finally, the pen 12 is displayed in the second picture 14 with the size of the pen 17, so as to present to the user. In this embodiment, the user selects the foreground image and determines the second picture is implemented by two actions having a certain time spacing.

The embodiments of the present application provide an information processing method and an electronic device, comprising: obtaining a first operation, the first operation being used to select a foreground image from a first picture; determining the foreground image in the first picture based on the first operation; obtaining status information of the foreground image; obtaining a second operation, the second operation being used to place the foreground image into a second picture; determining the second picture which serves as a background based on the second operation; obtaining status information of the second picture; determining a target size occupied by the foreground image in the second picture based on the status information of the foreground image and the status information of the second picture; scaling the foreground image into the target size; and displaying the foreground image in the second picture with the target size, to present to the user. In this way, it is possible to scale the foreground image automatically, and thereby improve user experience.

Figure 2:
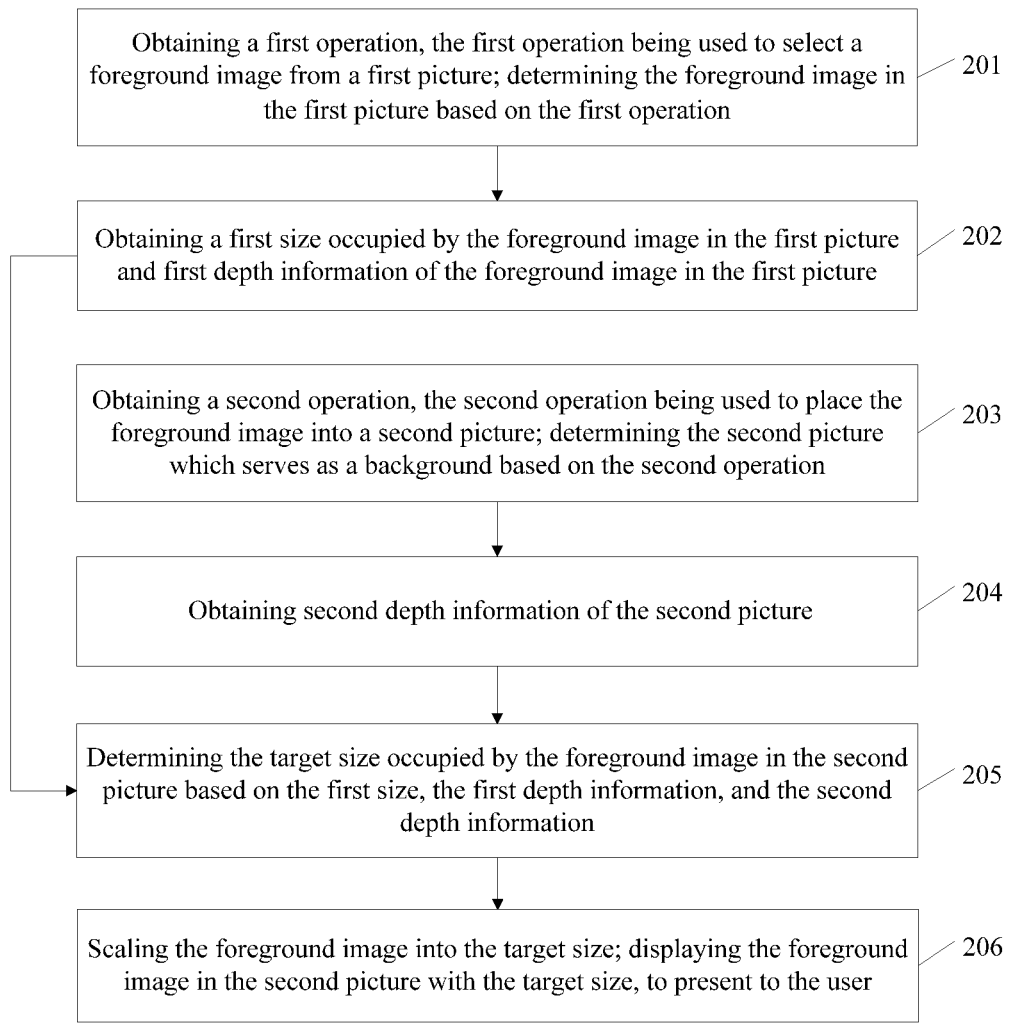
FIG. 2 is a schematic flowchart of implementation of an information processing method according to a second embodiment of present application.

Based on the first embodiment described above, an embodiment of the present application provides an information processing method applied to an electronic device, FIG. 2 is a schematic flowchart of implementation of an information processing method according to a second embodiment of present application, as shown in FIG. 2, the method comprises:

step 201: obtaining a first operation, the first operation being used to select a foreground image from a first picture; determining the foreground image in the first picture based on the first operation.

Herein, the first operation may be a predetermined action, in a specific implementation, the first operation may be a predetermined action in a picture editing application, for example, the picture editing application is enabled, a first picture is opened by using the picture editing application, thereafter a built-in tool in the picture editing application like a selecting tool or a cutting tool and so on is adopted to select an object from the first picture, this object is regarded as a foreground image. Of course, there is also a more convenient operating manner, for example, if a display unit of the electronic device is a touch type display screen, then the user can long-press a certain object in the first picture and regard the object as a foreground object, wherein long-press means an operating body stays on the object for a time period equal to or more than a threshold, for example, staying two seconds or more is regarded as a long-press operation, the operating body may be a finger and may be also be a stylus, it is allowed to long-press with a single finger or two fingers when adopting finger to long-press.

Herein, the first picture is composed by pixel points, each pixel point may comprise the following information, like color information and depth information, wherein the color information may be denoted by gray scale information and may also be denoted by chromatic information, the color is denoted only by brightness when adopting the gray scale information to denote, and denoted by saturation, tone, and brightness when adopting the chromatic information to denote.

Step 202, obtaining a first size occupied by the foreground image in the first picture and first depth information of the foreground image in the first picture.

Step 203, obtaining a second operation, the second operation being used to place the foreground image into a second picture; determining the second picture which serves as a background based on the second operation.

Herein, the first picture and the second picture are different, which only refers to that the background of the first picture and that of the second picture are different.

Step 204, obtaining second depth information of the second picture.

Step 205, determining the target size occupied by the foreground image in the second picture based on the first size, the first depth information, and the second depth information.

Step 206, scaling the foreground image into the target size; displaying the foreground image in the second picture with the target size, to present to the user.

In the embodiment of the present application, in step 205, determining the target size C' occupied by the foreground image in the second picture based on the first size, the first depth information, and the second depth information may be specifically calculated based on the following formula (1):

$$C' = \frac{d'}{d} C \qquad (1)$$

In formula (1), C' is the target size, C is the first size, d' is the first depth information, d is the second depth information.

In the embodiment of the present application, obtaining a first size occupied by the foreground image in the first picture comprises:

obtaining a total number of pixels included in the foreground image, which specifically comprises:

determining one by one whether a pixel in the first picture is in the foreground object, to obtain a first determination result;

when the first determination result shows that the pixel is in the foreground object, the number of pixels included in the foreground object plus one;

when the first determination result shows that the pixel is not in the foreground object, it is determined whether a next pixel in the first picture is in the foreground object.

The method of acquiring the total number of pixels included in the foreground image provided above, i.e., checking one by one whether each pixel in the first picture is in the foreground image, if it is determined that a pixel is in the foreground image, the total number of pixels in the foreground image plus one, otherwise it is determined whether a next pixel is in the foreground image, can obtain that the total number of pixels in the foreground image is C when the checking is finished.

In the embodiment of the present application, the status information further comprises a focal length of an image acquiring unit for taking a picture;

correspondingly, step 205, determining the target size occupied by the foreground image in the second picture based on the first size, the first depth information, and the second depth information comprises:

determining the target size occupied by the foreground image in the second picture based on the first size, the first depth information, the second depth information, a focal length of the image acquiring unit for taking the first picture, and a focal length of the image acquiring unit for taking the second picture, which may be specifically calculated based on the following formula (2).

$$C' = \frac{d' + f'}{d + f} C \qquad (2)$$

In formula (2), C' is the target size, C is the first size, d' is the first depth information, d' is the first depth information, d is the second depth information, f' is a focal length of the image acquiring unit for taking the second picture, f is a focal length of the image acquiring unit for taking the first picture, wherein the image acquiring unit comprises a camera or a video recorder. The focal length is a fixed internal parameter of the image acquiring unit and can be obtained by the method calibrated by a standard pattern, at present, the focal length of the image acquiring unit can be obtained by already-existed algorithms, no more details repeated.

Formula (2) may be transformed into formula (3) when the first picture and the second picture adopt the same image acquiring unit:

$$C' = \frac{d' + f}{d + f} C \qquad (3)$$

The first depth information and the second depth information in the above formulas (1) and (2) can be obtained from the corresponding image acquiring unit, each pixel point has corresponding depth information, the first depth information in the embodiment of the present application may be an average of depth information of the foreground image, the second information may be an average of depth information in the second picture.

In the embodiment of the present application, the above formulas (1) and (2) are deduced by the following steps, first, how to deduce formula (2) is introduced:

$$\frac{d' + f'}{d + f} = \frac{C'}{C} \Rightarrow C' = \frac{d' + f'}{d + f} C$$

In the above formula, $$\frac{d' + f'}{d + f} = \frac{C'}{C}$$

is commonly known, since the focal length f' of the image acquiring unit for taking the second picture is far less than d', and the focal length f of the image acquiring unit for taking the second picture is far less than d, then formula (1) can be deduced:

$$\frac{d' + f'}{d + f} = \frac{C'}{C} \Rightarrow \frac{d'}{d} = \frac{C'}{C} \Rightarrow C' = \frac{d'}{d} C.$$

Figure 3:
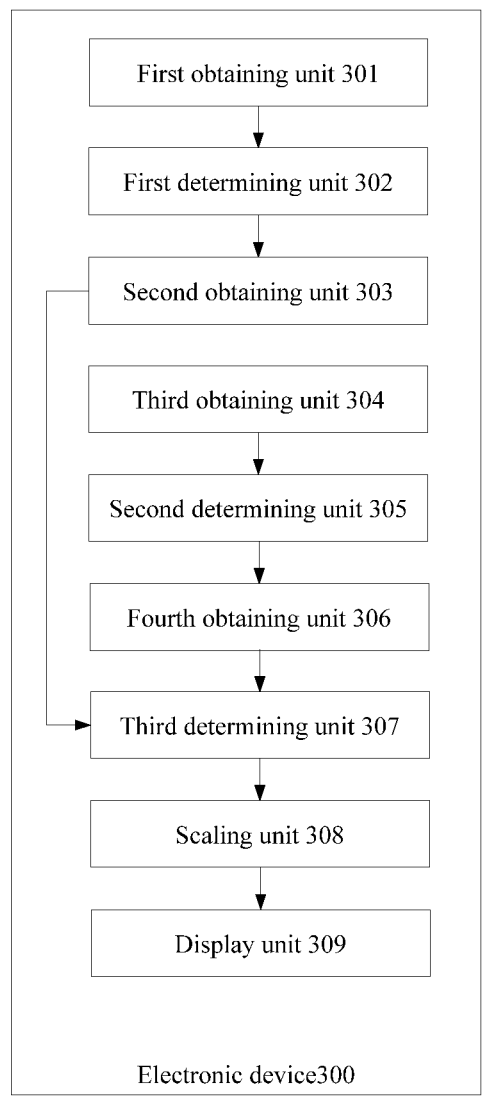
FIG. 3 is a structural schematic diagram of composition of an electronic device according to a third embodiment of the present application.

Based on the above method embodiment, an embodiment of the present application provides an electronic device, functions achieved by respective units comprised by the electronic device to be described below may be implemented by means of invoking program codes by a processor in the electronic device; FIG. 3 is a structural schematic diagram of composition of an electronic device according to a third embodiment of the present application, as shown in FIG. 3, the electronic device 300 comprises a first obtaining unit 301, a first determining unit 302, a second obtaining unit 303, a third obtaining unit 304, a second determining unit 305, a fourth obtaining unit 306, a third determining unit 307, a scaling unit 308, and a display unit 309, in which:

the first obtaining unit 301 is configured to obtain a first operation, the first operation being used to select a foreground image from a first picture;

the first determining unit 302 is configured to determine the foreground image in the first picture based on the first operation;

the second obtaining unit 303 is configured to obtain status information of the foreground image;

the third obtaining unit 304 is configured to obtain a second operation, the second operation being used to place the foreground image into a second picture;

the second determining unit 305 is configured to determine the second picture which serves as a background based on the second operation;

the fourth obtaining unit 306 is configured to obtain status information of the second picture;

the third determining unit 307 is configured to determine a target size occupied by the foreground image in the second picture based on the status information of the foreground image and the status information of the second picture;

the scaling unit 308 is configured to scale the foreground image into the target size; and the display unit 309 is configured to display the foreground image in the second picture with the target size, to present to the user.

In addition, the electronic device may further comprise an image acquiring unit (not shown) for acquiring the first picture and the second picture. Further, the image acquiring unit may comprise a first image acquiring sub-unit and a second image acquiring sub-unit, the first image acquiring sub-unit and the second image acquiring sub-unit are located at two sides of the electronic device, respectively, the first picture is taken by the first image acquiring sub-unit, and the second image is taken by the second image acquiring sub-unit.

Herein, the first operation may be a predetermined action, in a specific implementation, the first operation may be a predetermined action in a picture editing application, for example, the picture editing application is enabled, a first picture is opened by using the picture editing application, thereafter a built-in tool in the picture editing application like a selecting tool or a cutting tool and so on is adopted to select an object from the first picture, this object is regarded as a foreground image. Of course, there is also a more convenient operating manner, for example, if a display unit of the electronic device is a touch type display screen, then the user can long-press a certain object in the first picture and regard the object as a foreground object, wherein long-press means an operating body stays on the object for a time period equal to or more than a threshold, for example, staying two seconds or more is regarded as a long-press operation, the operating body may be a finger and may be also be a stylus, it is allowed to long-press with a single finger or two fingers when adopting finger to long-press.

Herein, the first picture is composed by pixel points, each pixel point may comprise the following information, like color information and depth information, wherein the color information may be denoted by gray scale information and may also be denoted by chromatic information, the color is denoted only by brightness when adopting the gray scale information to denote, and denoted by saturation, tone, and brightness when adopting the chromatic information to denote.

Herein, the status information at least comprises depth information of an object in a picture and a size occupied by the object in the picture, the size refers to a size of area that is occupied by the object, usually, the size occupied by the object may be denoted by the number of pixel points. The status information of the foreground image comprises depth information of the foreground image and a size occupied by the foreground image. Those skilled in the art can obtain the status information of the foreground image through various techniques, no more details repeated here.

Herein, the first picture and the second picture are different, which only refers to that the background of the first picture and that of the second picture are different.

Herein, the status information of the second picture comprises depth information of respective objects in the second picture, when the second picture comprises a plurality of objects, depth information of respective objects in the second picture may be the same and may also be different, wherein an object in the second picture may be a human and may also be a scenery and so on.

In the embodiment of the present application, the first operation and the second operation are actions having coherence, or the first operation and the second operation are two actions having a spacing of a first time period. When the first operation and the second operation are two actions having a spacing of a first time period, the above operation of obtaining the first operation can be similarly applied to the operation of obtaining the second operation, no more details repeated.

Next, scenes where the technical solution provided by the embodiment of the present application may be applied will be described with the first operation and the second operation are actions having coherence as an example. A picture editing application is enabled, as shown in FIG. 1B, two pictures 11 and 14 are opened by using the picture editing application, wherein the first picture 11 comprises a book 13 on which a pen 12 is lying; the second picture 14 comprises a desk 15 on which a stack of books 16 is lying. Thereafter, as shown in FIG. 1C, the user long-presses the pen 12 in the first picture 11, then the pen 12 is selected as the foreground image, then the pen 12 is placed on the desk 15 in the second picture 14 by dragging. As shown in FIG. 1D, the user releases the pen 12 at a proper position; as shown in FIG. 1E, a size of the pen 12 is scaled into a size of the pen 17, as can be perceived by the user, the application zooms out the size of the pen 12 in the first picture, so as to obtain the size of the pen 17, and thereby better fit the background in the second picture. It should be noted that during the process that the user long-presses the pen 12, the application can obtain the status information of the pen 12, when the user releases the pen 12, the application can also obtain the status information of the second picture 14, in this way, the application can determine the target size occupied by the pen 12 in the second picture 14 based on the status information of the pen 12 and the status information of the second picture 14; then the pen 12 is scaled as the target size (i.e., the size of the pen 17); finally, the pen 12 is displayed in the second picture 14 with the size of the pen 17, so as to present to the user. In this embodiment, the user implements the first operation and the second operation by a series of actions of long-pressing to select the foreground image and dragging the foreground image to a target position.

Next, scenes where the technical solution provided by the embodiment of the present application may be applied will be described with the first operation and the second operation are two actions having a spacing of a first time period as an example. A picture editing application is enabled, as shown in FIG. 1F, a first picture 11 is opened by using the picture editing application, wherein the first picture 11 comprises a book 13 on which a pen 12 is lying; thereafter, as shown in FIG. 1G, the user selects the pen 12 in the first picture 11 through a selecting tool on the application (the pen 12 in FIG. 1G is denoted by dotted line, which shows that the pen 12 is selected by the user), that is, the pen 12 is selected as the foreground image. Then, as shown in FIG. 1H, a second picture 14 is opened by using the picture editing application, the second picture 14 comprises a desk 15 on which a stack of books 16 is lying; thereafter, as shown in FIG. 1I, the user selects a proper position by the mouse or hand to place the previously selected pen 12 on the desk 15 in the second picture 14. As shown in FIG. 1J, a size of the pen 12 is scaled into a size of the pen 17, as can be perceived by the user, the application zooms out the size of the pen 12 in the first picture, so as to obtain the size of the pen 17, and thereby better fit the background in the second picture. It should be noted that during the process that the user long-presses the pen 12, the application can obtain the status information of the pen 12, when the user releases the pen 12, the application can also obtain the status information of the second picture 14, in this way, the application can determine the target size occupied by the pen 12 in the second picture 14 based on the status information of the pen 12 and the status information of the second picture 14; then the pen 12 is scaled as the target size (i.e., the size of the pen 17); finally, the pen 12 is displayed in the second picture 14 with the size of the pen 17, so as to present to the user. In this embodiment, the user selects the foreground image and determines the second picture is implemented by two actions having a certain time spacing.

The embodiments of the present application provide an information processing method and an electronic device, in which: the first obtaining unit 301 obtains a first operation; the first determining unit 302 determines the foreground image in the first picture based on the first operation; the second obtaining unit 303 obtains status information of the foreground image; the third obtaining unit 304 obtains a second operation; the second determining unit 305 determines the second picture which serves as a background based on the second operation; the fourth obtaining unit 306 obtains status information of the second picture; the third determining unit 307 determines a target size occupied by the foreground image in the second picture based on the status information of the foreground image and the status information of the second picture; the scaling unit 308 scales the foreground image into the target size; and the display unit 309 displays the foreground image in the second picture with the target size, to present to the user. In this way, it is possible to scale the foreground image automatically, and thereby improve user experience.

Based on the above third embodiment, an embodiment of the present application provides an electronic device, functions achieved by respective units comprised by the electronic device to be described below may be implemented by means of invoking program codes by a processor in the electronic device. The electronic device comprises: a first obtaining unit, a first determining unit, a second obtaining unit, a third obtaining unit, a second determining unit, a fourth obtaining unit, a third determining unit, a scaling unit, and a display unit, in which:

the first obtaining unit is configured to obtain a first operation, the first operation being used to select a foreground image from a first picture.

Herein, the first operation may be a predetermined action, in a specific implementation, the first operation may be a predetermined action in a picture editing application, for example, the picture editing application is enabled, a first picture is opened by using the picture editing application, thereafter a built-in tool in the picture editing application like a selecting tool or a cutting tool and so on is adopted to select an object from the first picture, this object is regarded as a foreground image. Of course, there is also a more convenient operating manner, for example, if a display unit of the electronic device is a touch type display screen, then the user can long-press a certain object in the first picture and regard the object as a foreground object, wherein long-press means an operating body stays on the object for a time period equal to or more than a threshold, for example, staying two seconds or more is regarded as a long-press operation, the operating body may be a finger and may be also be a stylus, it is allowed to long-press with a single finger or two fingers when adopting finger to long-press.

The first determining unit is configured to determine the foreground image in the first picture based on the first operation.

Herein, the first picture is composed by pixel points, each pixel point may comprise the following information, like color information and depth information, wherein the color information may be denoted by gray scale information and may also be denoted by chromatic information, the color is denoted only by brightness when adopting the gray scale information to denote, and denoted by saturation, tone, and brightness when adopting the chromatic information to denote.

The second obtaining unit is configured to obtain a first size occupied by the foreground image in the first picture and obtain first depth information of the foreground image in the first picture.

The third obtaining unit is configured to obtain a second operation, the second operation being used to place the foreground image into a second picture.

The second determining unit is configured to determine the second picture which serves as a background based on the second operation.

Herein, the first picture and the second picture are different, which only refers to that the background of the first picture and that of the second picture are different.

The fourth obtaining unit is configured to obtain second depth information of the second picture.

The third determining unit is configured to determine the target size occupied by the foreground image in the second picture based on the first size, the first depth information, and the second depth information.

The scaling unit is configured to scale the foreground image into the target size.

The display unit is configured to display the foreground image in the second picture with the target size, to present to the user.

Likewise, the electronic device may further comprise an image acquiring unit (not shown) for acquiring the first picture and the second picture. Further, the image acquiring unit may comprise a first image acquiring sub-unit and a second image acquiring sub-unit, the first image acquiring sub-unit and the second image acquiring sub-unit are located at two sides of the electronic device, respectively, the first picture is taken by the first image acquiring sub-unit, and the second image is taken by the second image acquiring sub-unit.

In the embodiment of the present application, the third determining unit can determine the target size C' occupied by the foreground image in the second picture based on the first size, the first depth information, and the second depth information, specifically, C' may be calculated based on the following formula (1):

$$C' = \frac{d'}{d}C \qquad (1)$$

In formula (1), C' is the target size, C is the first size, d' is the first depth information, d is the second depth information.

In the embodiment of the present application, obtaining, by the second obtaining unit, a first size occupied by the foreground image in the first picture comprises:

obtaining a total number of pixels included in the foreground image, which specifically comprises:

determining one by one whether a pixel in the first picture is in the foreground object, to obtain a first determination result;

when the first determination result shows that the pixel is in the foreground object, the number of pixels included in the foreground object plus one;

when the first determination result shows that the pixel is not in the foreground object, it is determined whether a next pixel in the first picture is in the foreground object.

The method of acquiring the total number of pixels included in the foreground image provided above, i.e., checking one by one whether each pixel in the first picture is in the foreground image, if it is determined that a pixel is in the foreground image, the total number of pixels in the foreground image plus one, otherwise it is determined whether a next pixel is in the foreground image, can obtain that the total number of pixels in the foreground image is C when the checking is finished.

In the embodiment of the present application, the status information further comprises a focal length of an image acquiring unit for taking a picture;

correspondingly, determining, by the third determining unit, the target size occupied by the foreground image in the second picture based on the first size, the first depth information, and the second depth information comprises:

determining the target size occupied by the foreground image in the second picture based on the first size, the first depth information, the second depth information, a focal length of the image acquiring unit for taking the first picture, and a focal length of the image acquiring unit for taking the second picture, which may be calculated based on the following formula (2).

$$C' = \frac{d' + f'}{d + f} C \quad (2)$$

In formula (2), C' is the target size, C is the first size, d' is the first depth information, d' is the first depth information, d is the second depth information, f' is a focal length of the image acquiring unit for taking the second picture, f is a focal length of the image acquiring unit for taking the first picture, wherein the image acquiring unit comprises a camera or a video recorder. The focal length is a fixed internal parameter of the image acquiring unit and can be obtained by the method calibrated by a standard pattern, at present, the focal length of the image acquiring unit can be obtained by already-existed algorithms, no more details repeated.

Formula (2) may be transformed into formula (3) when the first picture and the second picture adopt the same image acquiring unit:

$$C' = \frac{d' + f}{d + f} C \quad (3)$$

The first depth information and the second depth information in the above formulas (1) and (2) can be obtained from the corresponding image acquiring unit, each pixel point has corresponding depth information, the first depth information in the embodiment of the present application may be an average of depth information of the foreground image, the second information may be an average of depth information in the second picture.

In the embodiment of the present application, the above formulas (1) and (2) are deduced by the following steps, first, how to deduce formula (2) is introduced:

$$\frac{d' + f'}{d + f} = \frac{C'}{C} \Rightarrow C' = \frac{d' + f'}{d + f} C$$

In the above formula, $$\frac{d' + f'}{d + f} = \frac{C'}{C}$$

is commonly known, since the focal length f' of the image acquiring unit for taking the second picture is far less than d', and the focal length f of the image acquiring unit for taking the second picture is far less than d, then formula (1) can be deduced:

$$\frac{d' + f'}{d + f} = \frac{C'}{C} \Rightarrow \frac{d'}{d} = \frac{C'}{C} \Rightarrow C' = \frac{d'}{d} C.$$

In the following embodiments of the present application, the electronic device refers to a device capable of communicating with other devices. Specific forms of the electronic device comprise, but not limited to, a mobile phone, a personal computer, a digital camera, a personal digital assistant, a portable computer, a game machine and so on. The electronic device may be configured to display and process an image, for example, an image may be displayed in the electronic device, the electronic device may perform various processings on the displayed image, like storage, contour extraction, identification, segmentation, cutting, integration, and so on. The electronic device comprises a first image acquiring apparatus capable of acquiring an image, for example, the first image acquiring apparatus may be one or more among devices like a camera, a video recorder, a video camera, and may acquire one image or a plurality of images concurrently. According to an example of the present application, the first image acquiring apparatus may be for example a stereoscopic camera with a binocular camera, the stereoscopic camera can obtain stereoscopic information of the shot scene while taking a picture.

Figure 4:
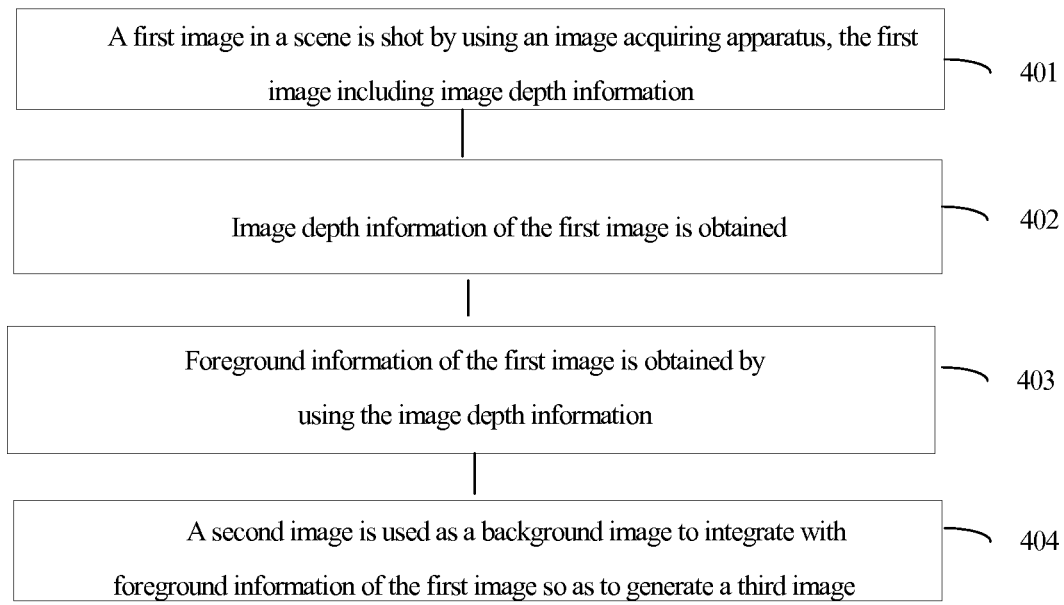
FIG. 4 is a schematic flowchart of implementation of an image processing method according to an embodiment of the present application.

FIG. 4 illustrates a schematic flowchart of implementation of an image processing method 400 according to a fifth embodiment of the present application. The image processing method 400 according to the fifth embodiment of the present application will be described below with reference to FIG. 4. The information processing method 400 may be applied to the above described electronic device. As shown in FIG. 4, in step 401, a first image in a scene is shot by using an image acquiring apparatus, the first image including image depth information. For example, it is possible to use one camera to shoot images in the same scene from different angles, or adopt a binocular camera to shoot images in the scene from different angles at the same moment, different objects in the scene have different depth information, for they have different distances from the camera.

In step 402, image depth information of the first image is obtained. According to an example of the present application, a binocular camera is used to shoot one scene at the same moment to obtain two images of this scene, wherein one image is regarded as a first image, the other is regarded an auxiliary image, the auxiliary image is used to compare with the first image, so as to obtain depth information of each pixel point in the first image. In order to accelerate matching efficiency and enhance robustness of matching algorithms, it is possible to divide the first image and the auxiliary image into a plurality of regions, each region in the first image corresponds to each region in the auxiliary image. Then, with the corresponding region as a unit, the pixel points in the first image are matched with the pixel points in the auxiliary image. For example, first, a position of one point in the first image is determined in the first image, then a corresponding region is found in the auxiliary image based on parameters like contour and/or image content and/or pixel value, and a pixel point with the same parameter is found in the region, for example, a search is made in the corresponding region in the auxiliary image based on relative information of the pixel point, so as to find the corresponding pixel point quickly. Thereafter, a depth calculating method well known for those skilled in the art is used to calculate the depth information of each pixel point in the first image according to position relationship of corresponding pixels in the first image and the auxiliary image.

In step 403, foreground information of the first image is obtained by using the image depth information. For example, it is possible to set a depth threshold for a demarcation point between foreground information and background information, depth information of each pixel point is compared with the depth threshold, a pixel point would be determined as foreground information when its depth information is less than the depth threshold, and determined as background information when its depth information is more than the depth threshold.

In step 404, a second image is used as a background image to integrate with foreground information of the first image so as to generate a third image. When a foreground region composed by pixel points which serve as foreground information in the first image and a background region composed by pixel points which serve as background information are determined based on the depth threshold, it is possible to separate the image region determined as belonging to background information and the image region determined as belonging to foreground information, then the user-desired background image is used as the second image to integrate with the foreground region, so as to generate the third image in which background replacement is achieved. For example, redundant data between the foreground image of the first image and the second image is processed to improve reliability of the generated third image, complementary information between the foreground region of the first image and the second image is processed to improve sharpness of the third image.

In the image processing method in this embodiment, the foreground region and the background region of an image are obtained based on the depth information, and the foreground region is integrated with the user-desired background image, so that it is possible to replace with a different background according to a different environment, and thereby satisfy the user's requirement.

In addition, according to another example of the present application, besides the first image acquiring apparatus, the electronic device may further comprise a second image acquiring apparatus, the second image acquiring apparatus and the first image acquiring apparatus are located at two sides of the electronic device, respectively, so that the user can conveniently use the second image acquiring apparatus to shoot an image as the second image, and then integrate foreground information extracted based on the depth information with the second image shot by the second image acquiring apparatus, so as to generate a new image. In this way, the user can use the electronic device with multiple cameras to shoot a plurality of pictures, respectively, and perform background replacement based on personal preference in real time, which not only facilitates using of the user, but also enriches the functions of the electronic device.

Figure 5:
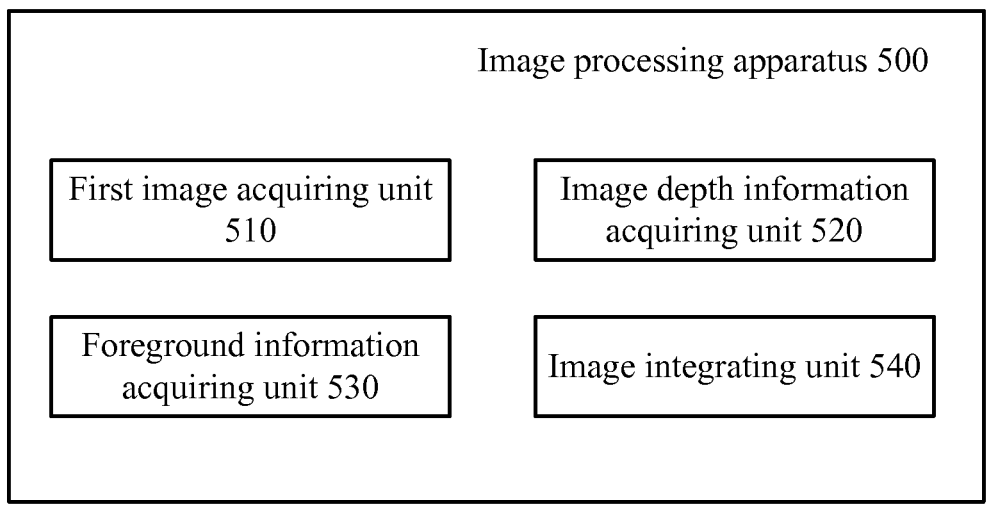
FIG. 5 is a structural schematic diagram of composition of an image processing apparatus according to an embodiment of the present application.

FIG. 5 shows an image processing apparatus according to an embodiment of the present application. The image processing apparatus according to an embodiment of the present application will be described below with reference to FIG. 5, the image processing apparatus is applied to the electronic device described above, the electronic device is configured to display and process an image, and comprises a first image acquiring apparatus, the image processing apparatus 500 including: a first image acquiring unit 510, an image depth information acquiring unit 520, a foreground information acquiring unit 530, and an image integrating unit 540. The aforesaid first image acquiring unit 510, image depth information acquiring unit 520, foreground information acquiring unit 530, and image integrating unit 540 may be hardware members that are physically independent to each other, and may also be a processor of the above-mentioned electronic device, for example, it is implemented by a CPU.

Respective modules of the image processing apparatus 500 execute respective steps/functions of the image processing method in FIG. 4, for the conciseness of description, no more details repeated.

For example, the first image acquiring unit 510 shoots a first image in a scene by using an image acquiring apparatus, the first image including image depth information. For example, it is possible to use one camera to shoot images in the same scene from different angles, or adopt a binocular camera to shoot images in the scene from different angles at the same moment, different objects in the scene have different depth information, for they have different distances from the camera.

The image depth information acquiring unit 520 obtains image depth information of the first image. According to an example of the present application, a binocular camera is used to shoot one scene at the same moment to obtain two images of this scene, wherein one image is regarded as a first image, the other is regarded an auxiliary image, the auxiliary image is used to compare with the first image, so as to obtain depth information of each pixel point in the first image. In order to accelerate matching efficiency and enhance robustness of matching algorithms, it is possible to divide the first image and the auxiliary image into a plurality of regions, each region in the first image corresponds to each region in the auxiliary image. Then, with the corresponding region as a unit, the pixel points in the first image are matched with the pixel points in the auxiliary image. For example, first, a position of one point in the first image is determined in the first image, then a corresponding region is found in the auxiliary image based on parameters like contour and/or image content and/or pixel value, and a pixel point with the same parameter is found in the region, for example, a search is made in the corresponding region in the auxiliary image based on relative information of the pixel point, so as to find the corresponding pixel point quickly. Thereafter, a depth calculating method well known for those skilled in the art is used to calculate the depth information of each pixel point in the first image according to position relationship of corresponding pixels in the first image and the auxiliary image.

The foreground information acquiring unit 530 obtains foreground information of the first image by using the image depth information. For example, it is possible to set a depth threshold for a demarcation point between foreground information and background information, depth information of each pixel point is compared with the depth threshold, a pixel point would be determined as foreground information when its depth information is less than the depth threshold, and determined as background information when its depth information is more than the depth threshold.

The image integrating unit 540 uses a second image as a background image to integrate with foreground information of the first image so as to generate a third image. When a foreground region composed by pixel points which serve as foreground information in the first image and a background region composed by pixel points which serve as background information are determined based on the depth threshold, it is possible to separate the image region determined as belonging to background information and the image region determined as belonging to foreground information, then the user-desired background image is used as the second image to integrate with the foreground region, so as to generate the third image in which background replacement is achieved. For example, redundant data between the foreground image of the first image and the second image is processed to improve reliability of the generated third image, complementary information between the foreground region of the first image and the second image is processed to improve sharpness of the third image.

In the image processing method in this embodiment, the foreground region and the background region of an image are obtained based on the depth information, and the foreground region is integrated with the user-desired background image, so that it is possible to replace with a different background according to a different environment, and thereby satisfy the user's requirement.

In addition, according to another example of the present application, besides the first image acquiring apparatus, the electronic device may further comprise a second image acquiring apparatus, the second image acquiring apparatus and the first image acquiring apparatus are located at two sides of the electronic device, respectively, so that the user can conveniently use the second image acquiring apparatus to shoot an image as the second image, and then integrate foreground information extracted based on the depth information with the second image shot by the second image acquiring apparatus, so as to generate a new image. In this way, the user can use the electronic device with multiple cameras to shoot a plurality of pictures, respectively, and perform background replacement based on personal preference in real time, which not only facilitates using of the user, but also enriches the functions of the electronic device.

In the several embodiments provided by present application, it should be understood that the device/apparatus and methods disclosed therein may also be implemented by other manners. The above described device/apparatus embodiments are merely illustrative, for example, the unit division is only a logical function division, there may be other division manners in practical implementation, such as: a plurality of units or components may be combined or may be integrated into another system, or some features may be omitted or not executed. In addition, coupling, or direct coupling, or communicative connection between the shown or discussed respective components may be achieved through some interfaces, indirect coupling or communicative connection between devices or units may be electrical, mechanical, or other forms.

Units described above as separate members may be or may not be physically separated, components showed as units may be or may not be physical units; they may be located at one place or distributed to a plurality of network cells; it is possible to select some or all of the units therein to achieve the purpose of solutions in the embodiments according to the actual needs.

Further, respective functional units in the embodiments of the present application may be all integrated in one processing unit and may also be separated as one unit each, or two or more units may also be integrated in one unit; the aforesaid integrated unit may be implemented in the form of hardware or in the form of hardware plus software functional unit.

As ill be appreciated by those of ordinary skill in the art: all or part of the steps of the above method embodiments may be completed by instructing relevant hardware through programs, these programs may be stored in a computer readable storage medium, the steps included in the above method embodiments will be executed when the programs are executed; the aforesaid storage medium comprises various mediums capable of storing program codes like a mobile storage device, a Read Only Memory (ROM), a magnetic disk, or an optical disk.

Alternatively, the above integrated units of the present application may also be stored in a computer readable storage medium when being implemented in the form of a software functional module and sold and used as an independent product. Based on such understanding, the substance or the part that contributes to the prior art of the technical solutions of embodiments of the present application may be reflected in the form of a software product, the computer software product may be stored in a storage medium, and comprise several instructions for causing a computer apparatus (which may be a personal computer, a server, or a network device) to fully or partially perform the method described in the various embodiments of the present application. The aforesaid storage medium comprises various mediums capable of storing program codes like a mobile storage device, a Read Only Memory (ROM), a magnetic disk, or an optical disk.

The above described are merely specific implementations of the present application, however, the protection scope of the present application is limited thereto, modifications or replacements that are easily conceivable for those skilled in the art within the technique range disclosed in the present application should all fall into the protection scope of the present application. Therefore, the protection scope of the present application should be based on what is claimed in the claims.

The invention claimed is:

1. An information processing method comprising:
 obtaining a first operation, the first operation being used to select a foreground image from a first picture;
 determining the foreground image in the first picture based on the first operation;
 obtaining status information of the foreground image;
 obtaining a second operation, the second operation being used to place the foreground image into a second picture;
 determining the second picture which serves as a background based on the second operation;
 obtaining status information of the second picture;
 determining a target size occupied by the foreground image in the second picture based on the status information of the foreground image and the status information of the second picture;
 scaling the foreground image into the target size; and
 displaying the foreground image in the second picture with the target size,
 the status information comprises depth information of an object in a picture and a size occupied by the object in the picture;

the obtaining status information of the foreground image comprises obtaining a first size occupied by the foreground image in the first picture and first depth information of the foreground image in the first picture;

the obtaining status information of the second picture comprises obtaining second depth information of the second picture;

the determining a target size occupied by the foreground image in the second picture based on the status information of the foreground image and the status information of the second picture comprises determining the target size occupied by the foreground image in the second picture based on the first size, the first depth information, and the second depth information, and wherein obtaining the first size occupied by the foreground image in the first picture comprises obtaining a total number of pixels included in the foreground image.

2. The method of claim 1, wherein the first operation and the second operation are actions having coherence; or, the first operation and the second operation are actions having a spacing of a first time period.

3. The method of claim 1, wherein the status information further comprises a focal length of an image acquiring unit for taking a picture; and the determining the target size occupied by the foreground image in the second picture based on the first size, the first depth information, and the second depth information comprises determining the target size occupied by the foreground image in the second picture based on the first size, the first depth information, the second depth information, a focal length of the image acquiring unit for taking the first picture, and a focal length of the image acquiring unit for taking the second picture.

4. The method of claim 3, wherein the image acquiring unit comprises a first image acquiring sub-unit and a second image acquiring sub-unit, the first image acquiring sub-unit and the second image acquiring sub-unit are located at two sides of the electronic device, respectively, the first picture is taken by the first image acquiring sub-unit, and the second image is taken by the second image acquiring sub-unit.

5. An electronic device comprising a processor and a display unit, in which the processor is configured to:

obtain a first operation, the first operation being used to select a foreground image from a first picture;

determine the foreground image in the first picture based on the first operation;

obtain status information of the foreground image;

obtain a second operation, the second operation being used to place the foreground image into a second picture;

determine the second picture which serves as a background based on the second operation;

obtain status information of the second picture;

determine a target size occupied by the foreground image in the second picture based on the status information of the foreground image and the status information of the second picture;

scale the foreground image into the target size; and the display unit is configured to display the foreground image in the second picture with the target size, wherein the status information comprises depth information of an object in a picture and a size occupied by the object in the picture, the processor is further configured to obtain a first size occupied by the foreground image in the first picture by obtaining a total number of pixels included in the foreground image and obtain first depth information of the foreground image in the first picture;

obtain second depth information of the second picture;

determine the target size occupied by the foreground image in the second picture based on the first size, the first depth information, and the second depth information.

6. The electronic device of claim 5, wherein the processor is further configured to obtain the first operation and the second operation having coherence or having a spacing of a first time period there between.

7. The electronic device of claim 5, wherein the status information further comprises a focal length of an image acquiring unit for taking a picture; and the processor is further configured to determine the target size occupied by the foreground image in the second picture based on the first size, the first depth information, the second depth information, a focal length of the image acquiring unit for taking the first picture, and a focal length of the image acquiring unit for taking the second picture.

8. The electronic device of claim 7, wherein the image acquiring unit comprises a first image acquiring sub-unit and a second image acquiring sub-unit, the first image acquiring sub-unit and the second image acquiring sub-unit are located at two sides of the electronic device, respectively, the first picture is taken by the first image acquiring sub-unit, and the second image is taken by the second image acquiring sub-unit.

* * * * *